Patented Mar. 15, 1949

2,464,717

UNITED STATES PATENT OFFICE 2,464,717

POLYVINYL ALCOHOL, FURFURAL, FORMAMIDE REACTION PRODUCT

Charles Arthur Porter, Belleville, N. J., assignor to Resistoflex Corporation, Belleville, N. J., a corporation of New York No Drawing. Application December 28, 1945, Serial No. 637,793

1 Claim. (Cl. 260—73)

This invention relates to polyvinyl alcohol compositions.

There is a need in industry for materials having the great advantage which polyvinyl alcohol has of being inert toward hydrocarbon fuels and oils and organic solvents yet which has greater hardness, toughness, dimensional stability, tensile strength and water resistance than is usually found in polyvinyl alcohol compositions. Such a need arises with respect particularly to the manufacture of certain types of gaskets, packing, valve diaphragms and similar goods. Plasticized polyvinyl alcohol compositions, formed to the desired shape by molding under heat and pressure, have heretofore not been suitable for certain uses for lack of the necessary characteristics.

In the investigation of numerous plasticized polyvinyl alcohol compositions containing different plasticizers in different amounts, with a view to finding a product to meet the need above mentioned, I was surprised to discover what appears to be a reaction product possessing entirely new and advantageous characteristics but still possessing the peculiar advantages of polyvinyl alcohol. The exact nature of the resulting product is not known but it is thought probable that it is the result of a cross-linking of the polyvinyl alcohol molecules.

According to the invention, I have found that sufficiently heating an admixture of completely saponified polyvinyl alcohol (known commercially as "Type B"), a small quantity of formamide and a small quantity of furfural produces a product unlike any heretofore known.

The copending application of Charles Dangelmajer, Ser. No. 511,554, filed November 24, 1943, now abandoned, discloses polyvinyl alcohol compositions containing formamide and paraform or other solid formaldehyde polymers, the latter being used in such amounts as to have a plasticizing effect on the composition, said application teaching the use of from 30 to 45 parts by weight of paraform to 100 parts of polyvinyl alcohol. In such compositions from 15 to 45 parts of formamide were found to improve the flowing properties of the compositions at elevated temperatures so as to make them readily moldable or extrudable.

The present invention is to be distinguished from that of the above mentioned application in that the aldehyde, furfural, is here used in such small quantities as not to act as a plasticizer, the maximum amount being not over about 10%, based on the polyvinyl alcohol. When so used, in conjunction with a similarly small amount of formamide, the composition, on being sufficiently heated, is converted into a product having entirely new properties. A temperature of at least 300° F. is used in molding to bring about the conversion and to produce a homogeneous product. Plasticizers commonly used in polyvinyl alcohol compositions, such as glycerol, glycerol esters and water are used to give the product a desirable but limited degree of flexibility and resiliency but they should not exceed in total amount, together with the aldehyde and formamide, more than about 30% by weight of the total composition.

As a specific example of how the invention is to be practiced, a composition was prepared of the following ingredients, parts by weight:

| | |
|---|---|
| Polyvinyl alcohol (completely saponified) | 100 |
| Glycerol | 20 |
| Diacetin | 3 |
| Water | 10 |
| Formamide | 5 |
| Furfural | 5 |

The glycerol, diacetin and water are used as plasticizers to impart a limited degree of flexibility to the composition and the formamide and furfural are used as reactants with the polyvinyl alcohol.

The liquid components were admixed and then evenly distributed through the powdered polyvinyl alcohol by spraying on the powder while stirring. This moistened powder was formed into molded sheets in a heated platen press. To produce a homogeneous body by molding was found to require a temperature of at least 300° F. When the mold was heated with steam under a gauge pressure of about 125 lbs. per square inch, a sheet was produced which was black in color and which could not be remolded, showing that the composition was of a thermosetting nature. Reheating the sheet to the point where it charred produced no melting. Tests made on the composition, but omitting the furfural, produced practically colorless sheets which would melt slightly on reheating. Omission of formamide alone from the composition also resulted in a colorless sheet which would melt slightly on reheating. It is therefore evident that when furfural and formamide are both present, a reaction takes place as indicated by the change of color and the loss of thermoplastic properties. This change has never been observed in compositions containing plasticizing amounts of aldehydes or other plasticizers in the usual amounts, which are capable of being sintered or rendered homogeneous at much lower temperatures.

The resulting product has unusual toughness and while quite hard it has some flexibility. It has very high tensile strength, high abrasive resistance, excellent fatigue characteristics, dimensional stability, good water resistance for a polyvinyl alcohol composition and no exudation whatever. At the same time the characteristic inertness of polyvinyl alcohol toward hydrocarbon fuels and oils and organic solvents is retained unimpaired.

The composition has insufficient flowing properties even when heated to maximum permissible temperature to permit of its being extruded and it must therefore be formed by molding. Molding times and temperatures may vary provided the material is heated sufficiently to sinter it. At 300° F. the molding cycle will be somewhat longer, for example, than at 350°.

The amount of 5% furfural, based on the polyvinyl alcohol, as given in the above example, is regarded as optimum. The quantity of formamide may vary from about 2% to 10% or above. In excess of 10% it serves no useful purpose. The aldehyde, however, should not exceed 10% or the characteristics of the composition will be substantially altered.

The foregoing detailed description is to be taken as illustrative of the invention defined in the claims and not as a limitation thereon.

What is claimed is:

The reaction product produced by heating under pressure at a temperature above 300° F. completely saponified polyvinyl alcohol, furfural, and formamide, each in an amount of from 2% to 10% of the polyvinyl alcohol.

CHARLES ARTHUR PORTER.

REFERENCES CITED

The following references are of record in the file of this patent:

UNITED STATES PATENTS

| Number | Name | Date |
|---|---|---|
| 2,037,049 | Sager | Apr. 14, 1936 |
| 2,083,628 | Zeiger | June 15, 1937 |
| 2,111,272 | Paulson | Mar. 15, 1938 |
| 2,162,618 | Izard | June 13, 1939 |
| 2,340,866 | Dangelmajer | Feb. 8, 1944 |
| 2,399,401 | Sonnichsen | Apr. 30, 1946 |
| 2,399,456 | Yates et al. | Apr. 30, 1946 |